A. D. JUDD.

Window Buttons.

No. 5,370. Reissued April 22, 1873.

Witnesses.

Chas H Smith

Geo. D. Walker

Inventor

Albert D. Judd

Lemuel W. Serrell atty.

AM. PHOTO-LITHOGRAPHIC CO. N.Y. (OSBORNE'S PROCESS.)

UNITED STATES PATENT OFFICE.

ALBERT D. JUDD, OF NEW HAVEN, CONNECTICUT.

IMPROVEMENT IN WINDOW-BUTTONS.

Specification forming part of Letters Patent No. 112,717, dated March 14, 1871; reissue No. 5,370, dated April 22, 1873; application filed November 26, 1872.

*To all whom it may concern:*

Be it known that I, ALBERT D. JUDD, of New Haven, in the State of Connecticut, have invented an Improvement in Sash-Fasteners or Window-Buttons, of which the following is a specification:

Before my invention the window button or fastener had been made with a lever connected to the plate or box in which it moved by means of a pivot, pin, or screw that was separate from both the lever and the plate. This pin or pivot is liable to become loose and to be bent or broken. My invention is made for the purpose of dispensing with the separate pin or pivot and rendering the fastening more secure and less expensive. I make use of a lever with a neck or journal cast upon it at the place where the lever turns in the plate or box, and there is a spring within said box. Thereby the lever swings upon its own journal. The spring is below the plate and out of sight, and acts to hold the lever in place and prevent the parts being separated until after the spring has been removed.

Figure 1:
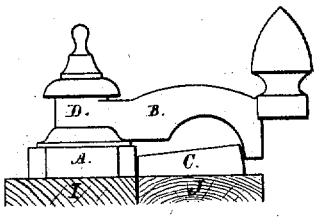
Figure 2:
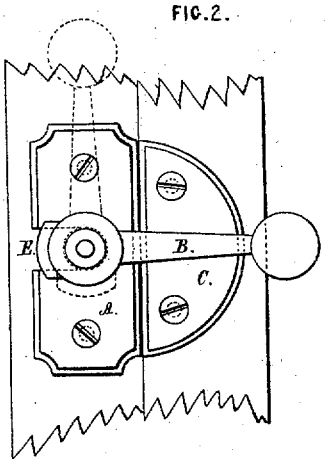
Figure 3:
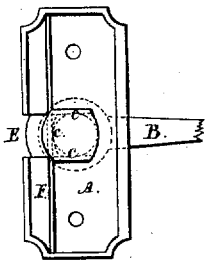
Figure 5:
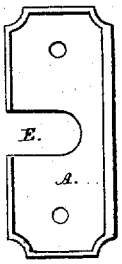
Figure 4:
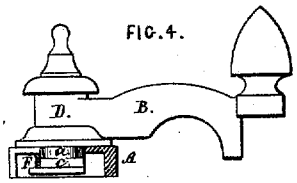
Figure 7:
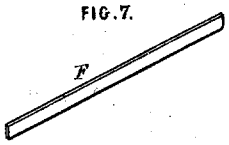
Figure 6:
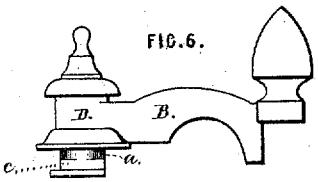

In the drawing, Fig. 1 is a side view of the said fastener. Fig. 2 is a plan. Fig. 3 is an inverted plan of the lever and its box. Fig. 4 is a side view of the lever with the box in section. Fig. 5 shows the box inverted. Fig. 6 is the lever detached, and Fig. 7 shows the spring.

The box A is made of a suitable size, and is to be attached by screws to the window, as usual. The lever B is made to hook in front of the keeper-plate C in the usual manner. The meeting-rails receiving these parts are shown at I J. The lever B is made with a hub or ornament, D, and a downward projection having a neck or journal, *a*, and a square at *c* for the spring F to act against in moving the lever to its position in line with the box, or at right angles to the same, or holding the lever at those points. The corners of this square act as cams to press the spring back as the lever is turned, and against one of these the spring acts in moving the lever to its terminal position. The box A is made with an opening at E that allows the neck *a* to be introduced into its place, with the spring-actuating surfaces *c* below the top of said box and within the same. The spring F is introduced after the lever has been inserted in its place and holds the parts together, so that A and B can only be separated after the spring F has been removed.

This construction of sash-fastener is very simple and cheap, the lever B with the neck and shank being cast in one piece and the box or plate A as a separate casting, and the box A containing the spring and its actuating surface is ornamental and incloses the parts heretofore generally visible. The fastening may be reversed in position, so that the spring may be adjacent to the retainer C, in which there may be a notch to lock the lever B, thus rendering the fastening burglar-proof.

I claim as my invention—

1. The sash-fastening lever, neck or journal, and spring bearing, cast in one piece, substantially as set forth.

2. And in combination with the above, the sash-fastener plate, with an opening for receiving the neck or journal of the lever, and for passing the spring bearing in below the plate, substantially as specified.

3. The sash-fastening containing the lever, neck, or journal and spring bearing cast in one piece, and retained within the plate by the spring, substantially as set forth.

Signed by me this 14th day of November, A. D. 1872.

A. D. JUDD.

Witnesses:
G. F. MOORE,
P. K. ANDREWS.